A. B. BATTELLE.

Covering for Steam and Hot Air Pipes.

No. 9,318. Reissued July 27, 1880.

Witnesses
Fred. G. Dieterich
Albert H. Krause.

Inventor.
Andrew B. Battelle
By J. J. Johnston
his attorney

UNITED STATES PATENT OFFICE.

ANDREW B. BATTELLE, OF BELLAIRE, OHIO.

COVERING FOR STEAM AND HOT-AIR PIPES.

SPECIFICATION forming part of Reissued Letters Patent No. 9,318, dated July 27, 1880.

Original No. 223,695, dated January 20, 1880. Application for reissue filed June 14, 1880.

*To all whom it may concern:*

Be it known that I, ANDREW B. BATTELLE, of Bellaire, in the county of Belmont and State of Ohio, have invented certain new and useful Improvements in Coverings or Shields for Pipes and other Articles; and I do hereby declare that the following is a full and exact description thereof, reference being had to the accompanying drawings, and to the letters of reference marked thereon.

My invention relates to an improved covering or shield for confining the heat around steam-pipes and other articles which radiate heat; and it consists, first, in the use and application of cotton-seed hulls applied to said pipes or other articles in the manner hereinafter described; second, in a covering or shield consisting of the combination of cotton-seed hulls and an outer casing; third, in a covering or shield consisting of the combination of cotton-seed hulls and an inner and outer casing; fourth, in a covering or shield consisting of the combination of cotton-seed hulls, an inner and outer casing, and an air-space between said inner casing and the steam-pipe or other article to which the covering or shield may be applied.

To enable others skilled in the art with which my invention is most nearly connected to make and use it, I will proceed to describe its construction and operation.

Figure 1:
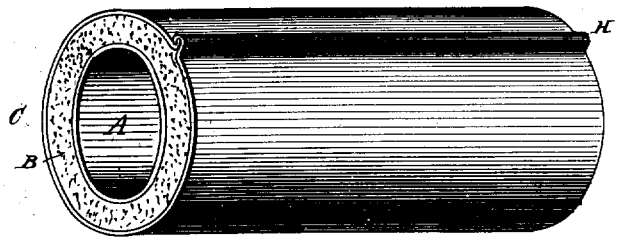
Figure 2:
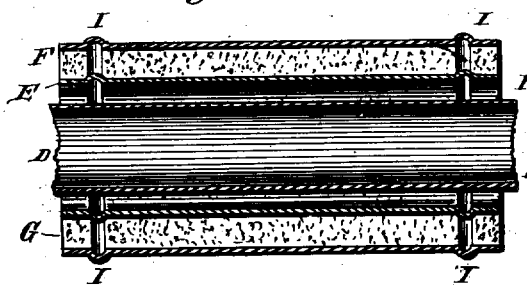
Figure 3:
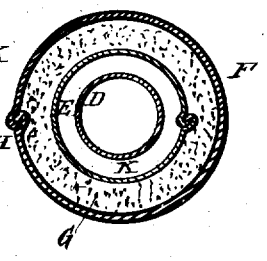
Figure 4:
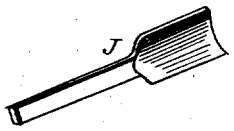

In the accompanying drawings, which form part of my specification, Figure 1 represents a covering or shield consisting of cotton-seed hulls and an outer casing as applied to a steam-pipe. Fig. 2 represents a covering or shield consisting of an inner and outer casing with raw cotton-seed hulls packed between said casings, said covering or shield being applied to a hot-air pipe with an air-space between said pipe and the inner casing of said covering or shield. Fig. 3 is a transverse section at line *y* of Fig. 2. Fig. 4 is a perspective view of a suitable tool for packing the cotton-seed hulls between the casings.

In the accompanying drawings, in Fig. 1 A represents the steam-pipe, B represents the cotton-seed hulls, and C the outer casing.

In Figs. 2 and 3 D represents a hot-air pipe; E, the inner casing; F, the outer casing, and G the cotton-seed hulls packed between them.

The outer and inner casing, when constructed of thin sheet metal, may be provided with a longitudinal-grooved seam or joint formed by grooving the edges of the metal, so that they will hook into each other, as indicated at H in Figs. 1 and 3; and said casing may, if desired, be furnished with a bead or beads near the ends of each section of the casing, as indicated at I.

I proceed to give two examples in applying my covering or shield as applied to steam and hot-air pipes. Other applications of the covering or shield will readily suggest themselves to the skilled mechanic.

As an example, in applying the covering to the pipes, I first take the sheet-metal casing, which is usually in short lengths, about thirty inches long, and spring it apart at the seam sufficient to permit it to be placed over the steam-pipe.

With the aid of two or more clips on the end of the casing, I secure a uniform annular space between the casing and steam-pipe, which I fill with cotton-seed hulls, tamping the same around the pipe with the tool J, made for this purpose. The elasticity of the metal and the pressure of the covering material hold the casing together at the joint H.

When it is desired to move the casing the sides are compressed near the joint sufficiently to unhook the edges, when the casing can readily be taken off.

The mode of application of the double casing is practically the same, the inner casing having metal projections on its surface to keep it from direct contact with the pipe. When the covering is to be put on while the pipes are being placed in position the double casing can be first packed and slipped over the pipe in sections. As the work progresses each section of the pipe joins with the other at the ends in the same manner as sheet-metal pipes in general.

When desired to close the end of the cylinder, I cut a round piece of sheet metal a little larger than the cylinder, turn a rim on the edge, cut out a central opening the size of the steam or hot-air pipe, cut the ring thus formed through one side and spring it over the steam-pipe and slip it on the end of the cylinder containing the covering. If required, a drop of solder will secure it in position.

In large pipes additional security can be obtained by means of bands of wire being placed a short distance apart along the cylinder. For hot-air pipes the double casing is peculiarly adapted, as it removes the covering material from direct contact with the hot-air pipe, and thus prevents any possible charring of the material from undue heat.

The form of the covering or shield must in all cases be adapted to the article to which it is to be applied, and in hot-air pipes, or other articles which are frequently highly heated, there should be an air-space between the casing and said pipe or other article, as indicated at *k* in Figs. 2 and 3.

In the construction of a covering or shield for the purposes hereinbefore specified, cotton-seed hulls have the following advantages: Lightness, non-conductibility, elasticity, practically non-combustibility, contains natural oil, which prevents oxidation when applied to metals, cheapness, durability, adaptability to various forms, and can be removed from or placed in connection with pipes or other things, as a covering or shield, with great facility.

Having thus described my invention, what I claim is—

1. As a covering or shield for steam-pipes and other articles, cotton-seed hulls, applied substantially as herein described.

2. In a covering or shield for steam-pipes and other articles, the combination of cotton-seed hulls and an outer casing, substantially as herein described.

3. In a covering or shield for steam-pipes and other articles, the combination of cotton-seed hulls and an inner and outer casing, substantially as herein described.

4. In a covering or shield for steam-pipes and other articles, the combination of cotton-seed hulls, an inner and outer casing, and an air-space between said inner casing and the steam-pipe or other article, substantially as herein described.

5. A covering for steam and hot-air pipes, composed of an outer-casing of metal having its edges bent so that they may be hooked together, and an interposed non-conducting filling of cotton-seed hulls, all constructed and arranged substantially as herein described.

A. B. BATTELLE.

Witnesses:
A. C. JOHNSTON,
JAMES J. JOHNSTON.